V. B. RYERSON.
Ore Amalgamator.
No. 32,488. Patented June 4, 1861.
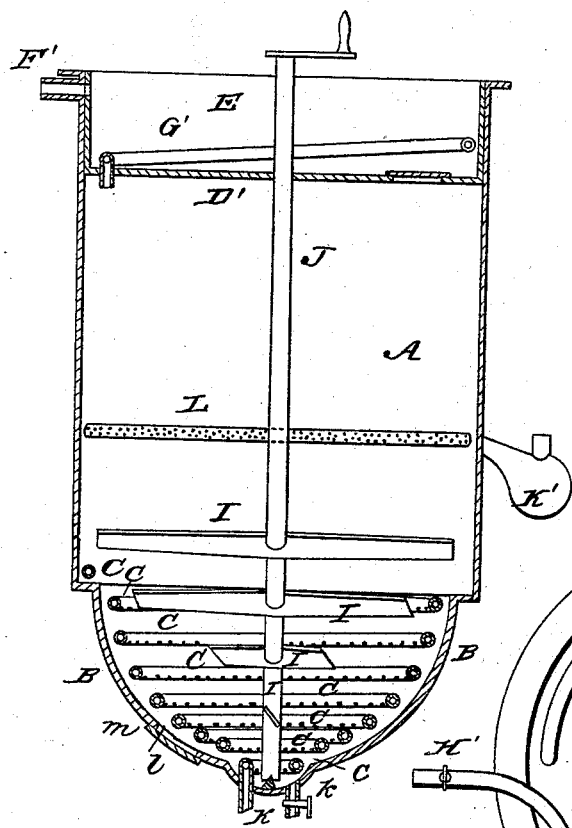
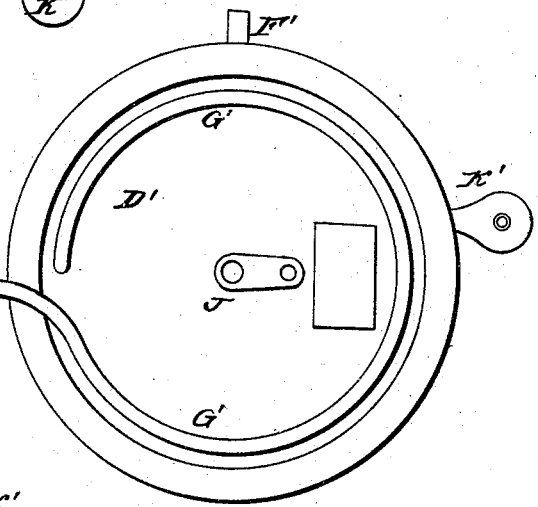
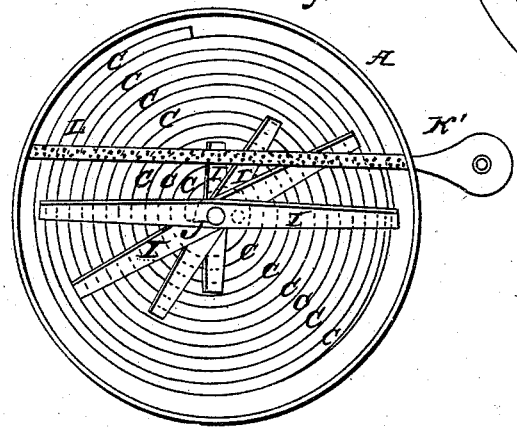

UNITED STATES PATENT OFFICE.

VAN BUREN RYERSON, OF NEW YORK, N. Y.

MODE OF CONDENSING MERCURY IN AMALGAMATING VESSELS.

Specification of Letters Patent No. 32,488, dated June 4, 1861.

*To all whom it may concern:*

Be it known that I, VAN BUREN RYERSON, of the city, county, and State of New York, have invented certain new and useful Improvements in the Process of Separating Gold and Silver from Foreign Substances by Amalgamation with Mercury; and I do hereby declare that the following is a full, clear, and exact description thereof, reference being had to the accompanying drawings, making part of this specification, in which—

Figure 1, is a plan of one form of apparatus which may be used in working my said process: Fig. 2, a vertical section; and Fig. 3, a horizontal section.

The same letters indicate like parts in all the figures.

In the processes heretofore practiced for separating gold or silver from ground or pulverized quartz or other granular foreign matter it has been found to be impossible to bring the mercury into contact with all the particles of gold or silver contained in such matter so as to amalgamate them, and this is particularly the case with the minute particles which by the operations of grinding or pulverizing, are flattened into laminæ so extremely thin that, notwithstanding the great specific gravity of gold and silver they will float on the surface of the water.

The object of my invention is to avoid this difficulty; and to this end my said invention for separating gold or silver from granular or pulverized foreign substances consists in condensing the vapor of mercury in a vessel containing the matter from which the gold or silver is to be separated, so that the mercury shall be diffused and greatly subdivided, and in that condition caused to pass through the charge the better to take up the particles of gold or silver by amalgamation. And my said invention also consists in the use or application of superheated steam (that is steam which has been heated, after being generated, to a temperature above the vaporizing point of mercury) to the charge of mercury and of ground or pulverized quartz or other granular matter containing gold or silver for the purpose of vaporizing the charge of mercury to subdivide and diffuse it, when this is used in connection with some suitable means for condensing the vapor of mercury that in the subdivided but condensed state it may pass through the charge of matter containing gold or silver to take it up by amalgamation and separate it from the foreign substance with which it was mixed.

The ground quartz or other granular or pulverized matter containing gold or silver and mixed together with the proper charge of mercury in water, as is usually practiced in the well known amalgamating processes, are put into a cylindrical vessel (A) having a semi-spherical or other dishing formed bottom (B). Near to the bottom of this vessel there is a coiled pipe (C) the upper end of which is closed, and the lower end of which passes through the central part of the bottom to be connected with a suitable steam boiler.

In passing from the boiler in which it is generated to the vessel (A) the steam must be made to pass through a suitable superheating apparatus to insure the heating of such steam to a temperature higher than that at which mercury will vaporize, and I prefer so to heat it up to about twelve hundred degrees of Fahrenheit's scale, more or less. This pipe (C) is pierced with numerous small holes along its lower part so that when the superheated steam is admitted, it will escape into the vessel (A) in numerous small jets toward the bottom (B) of the vessel, and as the pipe is placed near to the bottom of the said vessel, these numerous jets, thus discharged under pressure, will act on the mercury and the foreign matter contained in the said vessel, and force it upward, agitating the entire contents of the vessel in manner very similar to that which would be produced if sufficient heat were applied to the bottom of the vessel to cause the mercury to boil by evaporation. And in addition to this agitation of the contents of the vessel the mercury is evaporated by the heat of the superheated steam, and the vapor of the mercury rises in the vessel and when it reaches and comes in contact with the top (D') of the vessel (A) it is condensed and falls in a shower of minute particles, and in this divided state it descends through the charge in a state of agitation and is thus enabled to come in contact with and take up by amalgamation all the particles of gold or silver however minute, and wherever to be found in the charge.

To effect the condensation of the vapor of mercury as above specified, the top (D') of the vessel (A) is the bottom of a pan (E')

into which a stream of cold water is to be kept running from any suitable source, there being a hole at (F') near the top for the water to run out, so that the said pan is always supplied with cold water. Any other suitable mode of condensing the vapor of mercury may be substituted as the apparatus for effecting the condensation makes no part of my invention.

As it is important that the jets of superheated steam should enter the vessel (A) freely, and without serious resistance, and the superheated steam so introduced would act upon and generate steam from the water of the charge in the vessel (A) which steam so generated would soon equal the pressure of the superheated steam, although of a much lower temperature, some suitable means of relieving such pressure should be used, and the one which is represented in the accompanying drawings I have found in practice to answer a good purpose. It consists of an inclined pipe (G') in the condensing pan. Its lower end passes through the bottom of the said pan, and its upper end extends above the upper edge thereof, and is there provided with a stop cock or valve, as at (H'). The free escape through this pipe prevents the development of any undue pressure in the vessel (A) and as this pipe is inclined and lies in the water which keeps the condenser cool enough to condense the vapor of mercury, this pipe will also be kept cool enough to condense any vapor of mercury which may get into it with the steam; and the metallic particles thus produced by condensation will run back into the vessel (A) to perform the duty there required. All that is necessary is that the condenser and inclined pipe (H') should be maintained at a temperature sufficiently low to condense the vapor of mercury, and as this substance vaporizes at a temperature a little above six hundred degrees Fahrenheit's scale, it will be seen that the condenser need not be maintained at a very low temperature. Any other suitable mode of relieving the pressure in the vessel (A) may be substituted.

After the operation above described has been continued sufficiently long to insure the amalgamation of all the gold in the charge the supply of steam is to be shut off, and the amalgam permitted to settle to the bottom and this will be facilitated and expedited by adding more water to the charge, and by stirring the mass by means of vanes or arms (I) on a rotating vertical shaft (J) which may be rotated by hand or by any other power.

The mercury gradually settles at the bottom, and for the purpose of facilitating the collection I prefer to make the said bottom with an increased depression as at (K) at the center, of sufficient capacity to contain the charge of mercury. This depression is provided with a discharge pipe (k) and valve or stop cock, through which the amalgam is discharged that the gold or silver which it contains may be extracted by any suitable process. But before discharging the amalgam the refuse matter and water contained in the vessel are first to be discharged, which may be done through a large aperture (l) in the bottom (B) provided with a closing plate (m) secured in the manner of a man-hole plate. This discharge aperture should be made only a short distance above the depression (K) to facilitate the discharge of the foreign matter.

In charging the vessel (A) the material may be put in without water, as the condensation of the steam introduced into it will in a very short time furnish the required supply of water, but I prefer to put in water.

I attach to the outside of the vessel (A) a suitable retort (K') the neck of which extends into and across the vessel (A) in the form of a horizontal pipe (L) pierced with numerous small holes. This retort may be heated in any suitable manner. The amalgam of mercury and gold or silver obtained from a previous charge is put into this retort, and as the mercury is evaporated it escapes into and is diffused in the vessel (A), rises to the top and is there condensed, and falls in a shower of minute particles and operates to effect the collection of the particles of gold in the charge just as the mercury evaporated from the charge, as before described.

From the foregoing it will be seen that the first part of my invention may be worked by any means suitable for evaporating mercury so that the vapors thereof can be condensed in the vessel containing the charge of substances from which gold or silver are to be separated by amalgamation, whether the mercury be mixed with the said charge and there evaporated, or whether it be put in a retort outside and the vapor introduced into the vessel and therein condensed, but I prefer to put the mercury in the vessel with the charge, and vaporize it there by the introduction of superheated steam, as the steam, so introduced, agitates the whole charge and thereby greatly facilitates the process of amalgamation; and by taking the amalgam produced by working one charge, and distilling the mercury therefrom to obtain the gold or silver and introducing the vapor thus produced into the vessel to be there condensed to aid the mercury put into the vessel with the charge, the operation is rendered more perfect and economical and hence it is that I prefer to work the several parts of my invention connectedly, although they may be worked separately and produce good results. And although I have above described an apparatus such as I have found to be suitable for working my said process, I do not wish to be understood as limiting myself to the use of such as it will be obvious that other apparatus may be substituted without changing the process which I have invented and described.

What I claim as new and desire to secure by Letters Patent is—

1. The process of separating gold or silver from foreign substances by condensing the vapor of mercury in a vessel containing the substances from which the gold or silver are to be separated, substantially as described, so that the mercury shall be diffused and subdivided, and in that condition caused to pass through the charge the better to take up the particles of metal by amalgamation, as described.

2. The application of superheated steam to the charge of mercury and of gold or silver in pulverized or granular foreign substances, substantially as described, for the purpose of vaporizing the charge of mercury so that it may be diffused and subdivided, and to agitate the entire charge, as described, when this is applied in combination with the process of condensation, substantially as described, that the mercury may be condensed in minute particles, and in that condition pass through the charge the better to take up the particles of gold or silver by amalgamation, as described.

V. B. RYERSON.

Witnesses:
  A. DE LACY,
  GEO. W. L. GAGER.